United States Patent
West et al.

(10) Patent No.: US 10,022,842 B2
(45) Date of Patent: Jul. 17, 2018

(54) METHOD AND SYSTEMS TO CONTROL OPTICAL TRANSMISSIVITY OF A POLISH PAD MATERIAL

(71) Applicant: Thomas West, Inc., Sunnyvale, CA (US)

(72) Inventors: Thomas West, Portola Valley, CA (US); Gary Quigley, Loomis, CA (US); Pepito Galvez, San Jose, CA (US); Peter McKeever, Redwood City, CA (US); Suli Holani, Sunnyvale, CA (US)

(73) Assignee: Thomas West, Inc., Sunnyvale, CA (US)

( * ) Notice: Subject to any disclaimer, the term of this patent is extended or adjusted under 35 U.S.C. 154(b) by 142 days.

(21) Appl. No.: 14/626,256

(22) Filed: Feb. 19, 2015

(65) Prior Publication Data

US 2015/0231766 A1 Aug. 20, 2015
US 2017/0203411 A9 Jul. 20, 2017

Related U.S. Application Data

(63) Continuation of application No. 13/854,856, filed on Apr. 1, 2013.

(60) Provisional application No. 61/619,328, filed on Apr. 2, 2012, provisional application No. 61/942,457, filed on Feb. 20, 2014.

(51) Int. Cl.
*B24B 49/12* (2006.01)
*B24D 13/14* (2006.01)
*B24D 11/00* (2006.01)

(52) U.S. Cl.
CPC ............ *B24D 13/14* (2013.01); *B24D 11/001* (2013.01)

(58) Field of Classification Search
CPC ........ B24D 13/14; B24D 11/00; B24D 11/001
USPC .................... 451/533, 534, 526, 288, 287, 6
See application file for complete search history.

(56) References Cited

U.S. PATENT DOCUMENTS

| 2,870,054 A | 1/1959 | Amos et al. |
| 3,253,070 A | 5/1966 | Gerson et al. |
| 4,808,364 A | 2/1989 | Blunt et al. |

(Continued)

FOREIGN PATENT DOCUMENTS

| JP | 200042901A A | 2/2000 |
| JP | 2001277304 A | 10/2001 |

(Continued)

OTHER PUBLICATIONS

Patent Cooperation Treaty Application No. PCT/US2013/034858, "International Search Report" and "Written Opinion" dated Jul. 9, 2013.

(Continued)

*Primary Examiner* — Robert Rose
(74) *Attorney, Agent, or Firm* — Carr & Ferrell LLP (57) ABSTRACT

A method and systems for controlling optical transmissivity of a polish pad material are provided. The method and systems may include adjusting control parameters to determine the optical transmissivity of a polish pad material. The control parameters may also include pre-processing controls, casting controls, and/or curing controls. Methods and systems also provided for assembling a polish pad that controls the optical transmissivity of the polish pad. Additionally, a polish pad with a controlled optical transmissivity is provided.

18 Claims, 4 Drawing Sheets

(56) References Cited

U.S. PATENT DOCUMENTS

| | | | |
|---|---|---|---|
| 5,681,612 A * | 10/1997 | Benedict | B24D 3/28 427/202 |
| 5,713,120 A | 2/1998 | Watabe et al. | |
| 6,171,181 B1 * | 1/2001 | Roberts | B24B 37/205 451/526 |
| 6,267,917 B1 | 7/2001 | Guzikowski et al. | |
| 6,406,363 B1 | 6/2002 | Xu et al. | |
| 6,422,921 B1 | 7/2002 | Ettinger | |
| 6,641,471 B1 * | 11/2003 | Pinheiro | B24B 37/04 451/443 |
| 6,752,690 B1 | 6/2004 | Fruitman | |
| 6,857,941 B2 | 2/2005 | Emami et al. | |
| 6,884,156 B2 * | 4/2005 | Prasad | B24D 3/32 451/527 |
| 6,905,402 B2 | 6/2005 | Allison et al. | |
| 7,275,928 B2 * | 10/2007 | Kolesar | B29C 39/006 366/137 |
| 7,414,080 B2 | 8/2008 | Kulp | |
| 8,257,545 B2 | 9/2012 | Loyack et al. | |
| 9,156,124 B2 * | 10/2015 | Allison | B24B 37/205 |
| 2002/0081946 A1 | 6/2002 | Scott et al. | |
| 2002/0084547 A1 | 7/2002 | Naus et al. | |
| 2003/0090024 A1 | 5/2003 | Skov et al. | |
| 2003/0181155 A1 | 9/2003 | West et al. | |
| 2004/0005423 A1 | 1/2004 | Dalton et al. | |
| 2004/0023737 A1 | 2/2004 | Fair | |
| 2004/0023767 A1 | 2/2004 | Kato et al. | |
| 2004/0055223 A1 | 3/2004 | Ono et al. | |
| 2004/0096608 A1 | 5/2004 | King et al. | |
| 2004/0113322 A1 | 6/2004 | Grimmer et al. | |
| 2004/0134792 A1 | 7/2004 | Butterfield et al. | |
| 2004/0248508 A1 | 12/2004 | Lombardo et al. | |
| 2004/0259484 A1 | 12/2004 | Prasad et al. | |
| 2005/0107007 A1 | 5/2005 | Furukawa et al. | |
| 2005/0136206 A1 | 6/2005 | Cormier et al. | |
| 2005/0171224 A1 | 8/2005 | Kulp | |
| 2005/0197050 A1 | 9/2005 | Prasad et al. | |
| 2005/0218548 A1 | 10/2005 | Preston et al. | |
| 2006/0052040 A1 | 3/2006 | Prasad | |
| 2006/0088622 A1 | 4/2006 | Persico | |
| 2007/0066195 A1 | 3/2007 | Duong | |
| 2007/0141312 A1 | 6/2007 | James | |
| 2007/0144074 A1 | 6/2007 | Petersen | |
| 2007/0275229 A1 | 11/2007 | Laws et al. | |
| 2008/0207100 A1 | 8/2008 | Roy et al. | |
| 2008/0274674 A1 | 11/2008 | Prasad et al. | |
| 2009/0043398 A1 | 2/2009 | Yakimicki et al. | |
| 2009/0075568 A1 | 3/2009 | Kimura et al. | |
| 2010/0001425 A1 | 1/2010 | Pop-Iliev et al. | |
| 2010/0063172 A1 | 3/2010 | Negle | |
| 2010/0087128 A1 | 4/2010 | Nakayama et al. | |
| 2010/0112919 A1 | 5/2010 | Bonner et al. | |
| 2011/0021123 A1 | 1/2011 | Kulp et al. | |
| 2011/0159793 A1 | 6/2011 | Pai et al. | |
| 2011/0221089 A1 | 9/2011 | Pop-Iliev et al. | |
| 2012/0302148 A1 | 11/2012 | Bajaj et al. | |
| 2012/0315830 A1 | 12/2012 | Joseph et al. | |
| 2013/0260657 A1 * | 10/2013 | West | B24B 37/24 451/527 |
| 2014/0287663 A1 | 9/2014 | West et al. | |

FOREIGN PATENT DOCUMENTS

| | | |
|---|---|---|
| JP | 2003001565 A | 1/2003 |
| JP | 2005322790 A | 11/2005 |
| KR | 1020160124208 | 11/2005 |
| KR | 100771562 B1 | 10/2007 |
| KR | 1020100041160 A | 4/2010 |
| KR | 1020100096718 A | 9/2010 |
| KR | 101021783 B1 | 3/2011 |
| KR | 1020150002734 A | 1/2015 |
| KR | 1020170018359 | 2/2017 |
| TW | 340082 B | 9/1998 |
| TW | 200530382 A | 9/2005 |
| TW | 200640612 A | 12/2006 |
| TW | I295949 B | 4/2008 |
| TW | I311512 B | 7/2009 |
| TW | 200946279 A | 11/2009 |
| TW | I359718 B | 3/2012 |
| TW | 102111787 A | 1/2014 |
| TW | 201402275 A | 1/2014 |
| TW | 201534430 A | 9/2015 |
| TW | 201607643 A | 3/2016 |
| WO | WO2013151946 A1 | 10/2013 |
| WO | WO2015127077 A1 | 8/2015 |
| WO | WO2015187338 A1 | 12/2015 |

OTHER PUBLICATIONS

Patent Cooperation Treaty Application No. PCT/US2015/016615, "International Search Report" and "Written Opinion" dated May 20, 2015.
Patent Cooperation Treaty Application No. PCT/US2015/030903, "International Search Report" and "Written Opinion" dated Sep. 4, 2015.
Singapore Patent Application No. 11201406287Q, "Office Action," dated Nov. 2, 2015.
Taiwan Patent Application No. 104105866, "Notice of Request for Submission of Argument," Oct. 3, 2016, 8 pages [12 pages including translation].
Non-Final Office Action, dated Jan. 11, 2017, U.S. Appl. No. 14/297,177, filed Jun. 5, 2014.
Final Office Action, dated Jan. 24, 2017, U.S. Appl. No. 13/854,856, filed Apr. 1, 2013.
"Office Action," Taiwan Patent Application No. 104105866, dated May 17, 2017, 5 pages [8 pages including translation].
Advisory Action, dated Apr. 14, 2017, U.S. Appl. No. 13/854,856, filed Apr. 1, 2013.
Non-Final Office Action, dated Jul. 12, 2017, U.S. Appl. No. 14/297,177, filed Jun. 5, 2014.
Non-Final Office Action, dated Jul. 20, 2017, U.S. Appl. No. 13/854,856, filed Apr. 1, 2013.
"Office Action," Singapore Patent Application No. 11201610107T, dated Dec. 14, 2017, 6 pages.
"Office Action," Taiwan Patent Application No. 102111787, dated Dec. 11, 2017, 6 pages [15 pages including translation].
"Office Action," Singapore Patent Application No. 11201606734R, dated Jul. 11, 2017, 7 pages.
Taiwan Patent Application No. 102111787, "Office Action," dated Jan. 11, 2017, 22 pages.
"Search Report," Singapore Patent Application No. 10201608125W, dated Apr. 9, 2018, 5 pages.

* cited by examiner

METHOD AND SYSTEMS TO CONTROL OPTICAL TRANSMISSIVITY OF A POLISH PAD MATERIAL

CROSS-REFERENCE TO RELATED APPLICATIONS

This U.S. Patent Application claims the benefit of U.S. Provisional Patent Application No. 61/942,457 filed on Feb. 20, 2014, and is also is a continuation-in-part of and claims the benefit of U.S. patent application Ser. No. 13/854,856 filed on Apr. 1, 2013, which claims the benefit of U.S. Provisional Patent Application No. 61/619,328, filed on Apr. 2, 2012, the disclosures of which are incorporated by reference herein in their entirety for all purposes.

FIELD OF THE INVENTION

The present disclosure relates generally to polishing pads. More specifically, the present disclosure relates to methods for controlling the optical transmissivity of a polish pad material.

SUMMARY

A method and systems for controlling an optical transmissivity of a polish pad material may include adjusting control parameters to determine an optical transmissivity of the polish pad material and may further include pre-processing controls, casting controls, and/or curing controls. The method may also include selecting chemical ingredients for forming the polish pad material that may be based in part on a ratio of hard to soft segments of the chemical ingredients and/or a mass of the chemical ingredients. The chemical ingredients may include a cross-linker, a chain extender, and/or a plasticizer. Selecting chemical ingredients may be a function of polymer structure that may be isocyanate type, isomer structure, and/or polyol type.

In various exemplary embodiments, the method includes mixing the chemical ingredients to result in an even dispersion within a mixture of the chemical ingredients. The control parameters may include pre-processing controls that may include at least one of controlling a first temperature of the chemical ingredients individually before mixing and controlling a second temperature of the chemical ingredients during mixing. The controlling of the first temperature and/or the second temperature may include controlling a rate of temperature change.

The selecting chemical ingredients for forming the polish pad material may include adding a material with a lower density than the chemical ingredients to the chemical ingredients. The material with a lower density may be microspheres.

In various exemplary embodiments, the control parameters include the casting controls that include a temperature and/or a pressure of the polish pad material during a casting operation. The casting temperature controls may include controlling a rate of temperature change. The casting controls may also include centrifugal force from rotating the polish pad material in a cylinder, a thickness variation of the polish pad material may be a function of centrifugal force from rotating the polish pad material in a cylinder.

The control parameters may additionally include curing controls and the curing controls may include time, temperature, and/or pressure of the polish pad material during curing. The temperature control of the curing controls may include a rate of temperature change.

The methods and systems of the present technology include a method for assembling a polish pad that controls the optical transmissivity of the polish pad. The method may include arranging a first polymer precursor for a sub-pad in a mold in a centrifugal caster, rotating the centrifugal caster to form the sub-pad, arranging a second polymer precursor for a top-pad in the mold on top of the sub-pad, and adjusting control parameters of the first polymer precursor, the rotating of the centrifugal caster, and/or the second polymer precursor. The method may further include forming a window in the sub-pad to facilitate optical transmission of light through the top-pad using a mold, laser machining, and/or mechanical machining.

Embodiments of the present technology include a polish pad with a controlled optical transmissivity including a top-pad layer with a polymer layer being substantially homogeneous and having a low total thickness variation, being absent of voids, and being substantially transmissive to visible light. The polish pad may also include a sub-pad layer with materials of different densities and may include a window. The materials of different densities may include microspheres and the window may contain a second polymer with the transmissivity of the second polymer being greater than a transmissivity of the sub-pad.

DETAILED DESCRIPTION

Polishing (also referred to as planarizing) is a process step which is commonly used in the manufacture of semiconductor, hard disk drive and optical products. The polishing process used for the manufacture of semiconductor devices generally consists of rubbing a substrate against a polymer pad, or vice versa. A chemical solution, usually containing fine particles (the slurry), is present at the interface between the substrate and the polymer pad.

Polishing may also be referred to as Chemical Mechanical Planarization (CMP). Polymer polish pads used for CMP may use closed cell polyurethane materials, while some polish pads used for CMP employ open cell polyurethane materials. Additionally, fiber impregnated with polymer (e.g. felt materials), or polymers combined with abrasives may be utilized. The surface of such pads may contain a micro texture. The micro texture may complement the conditioning process and ultimately the polish performance of the pad. Inconsistencies in this inherent micro structure may lead to deviations in the polish performance of the pad. For this reason, pad manufacturers have worked to refine pad manufacturing processes to reduce such variation in their products. In contrast, a solid homogenous polymer polish pad contains no inherent micro structure, and instead it typically relies on the conditioning process to impart a micro texture to the pad surface. Polish pads may have one or more layers. For cases where the polish pad has more than one layer, the polishing surface is called the top-pad and the other layer(s) are referred to as the sub-pad or sub-pad stack. A polish pad including at least a single polish layer, which does not contain open or closed cell structures, or cell structures that are dissolved with polish slurry, is often referred to as a solid pad.

Polish endpoint detection for a CMP process has evolved from a "look and see" model to an in situ system that avoids interruption of the polishing/planarizing process. The two dominant endpoint detection systems are 1) optical endpoint detection, and 2) motor current/torque endpoint detection. To enable the use of an optical endpoint detection system on a polisher tool, the polish pad to be used with such a system must contain a region through which light can be transmitted. This region on the pad needs to align with the location of the endpoint detection system on the polishing tool. Typically, this region on the pad through which light is transmitted is called a window. A variety of methods are used to impart a window into the polishing pad. They include creating an aperture on the top and inserting a transparent material. Another method used is to polymerize a transparent material in the cut out window area of the top-pad. In all cases, a corresponding aperture needs to be created in the sub-pad layers. In many cases, a transparent plug material will be inserted into the aperture created in the sub-pad layers to provide support to the window in the top-pad material.

Light as used herein is not limited to visible wavelengths, and may have a wavelength anywhere between 190 nm to 3500 nm. Transparent as used herein includes translucent, and in particular includes any non-zero transmissivity for a particular wavelength.

With the development of solid polish pads, transmission of light through the pad is possible and effective for endpoint detection. Light reflection, absorption, and scattering in non-solid pads reduce signal intensity below usable levels for endpoint detection. Optical transmissivity is a preferred exemplary embodiment, and references herein to transmissivity include, but are not limited to, optical transmissivity. According to the present technology, the transmissivity of a polish pad may be controlled, and therefore may be tuned to particular requirements. By adjusting the input process parameters of the casting and polymerization system, the optical transmission of the resulting polish pad material may be controlled. Representative, but not exclusive parameters that may be adjusted include selecting chemical ingredients for the polymer mixture. Further, the control parameters of the casting and polymerization system may be adjusted, including temperature and pressure, and, in the case of a centrifugal caster, the speed of rotation.

Light transmission through polymers is affected by the degree of crystallinity of the polymer. Amorphous polymers are characterized by a random, disordered tangle of polymer chains. Crystalline polymers have a higher degree of order resulting from alignment of chains within folded or stacked chain regions. While there are some polymers that are completely amorphous, most polymers have at least some crystalline regions.

The crystalline regions within a polymer have a different refractive index than the amorphous regions, leading to refraction and scattering of light passing through the polymer. For this reason, amorphous polymers are frequently transparent, while crystalline polymers are translucent or opaque.

Some polymers tend to be amorphous (e.g. polycarbonate, poly(methyl methacrylate), polystyrene) and some tend to be crystalline (e.g. nylon, polypropylene). However, most polymers can take on different degrees of crystallinity depending on the polymer structure (e.g. chain length, degree of cross-linking, presence of side groups, etc.). An example of this is polyethylene, where more amorphous versions (e.g. Low-Density Polyethylene (LDPE), Linear Low-Density Polyethylene (LLDPE)) are transparent, while more crystalline versions (e.g. High-Density Polyethylene (HDPE)) are translucent.

Embodiments of the present technology use processing conditions to vary the degree of crystallinity. For example, slow cooling of molten thermoplastics gives more time for crystalline structures to form, while a rapid quench freezes in the amorphous orientations present in the melt. Mechanical processes, such as extrusion or blow molding, apply directional forces and tend to orient the polymer chains and increase crystallinity.

Exemplary embodiments of the present technology use these behaviors to control transparency of the polymers used for polishing pad materials. The vast majority of pads are inherently unsuitable for use as a window material due to the scattering and absorption caused by the pores or other fillers used to control the mechanical properties of the pad. In these cases, an alternate window material that is optimized for transmission, but does not confer good polishing characteristics, is added separately to the pad.

Various embodiments of the present technology use the chemical structure of polyurethane. Configurations present in polyurethane elastomers used for polishing pads show two distinct regions are present within the polymer chains: the hard, rigid segment formed by the reacted isocyanate (e.g. urethane) and chain extension groups, and, the soft, flexible segment formed by the polyols (e.g. polyethers, polyesters). The hard segment tends to form ordered, crystalline regions due to strong hydrogen bonds between urethane groups, while the soft segments remain amorphous.

Embodiments of the present technology use the ratio of hard to soft segments present in the polyurethane to control the degree of structure within a polymer and to influence transparency. This ratio also affects many other properties including the mechanical behavior of the polymer, so changes are carefully considered against the overall requirements of the polymer for the polishing pad. Beyond a simple modification of the hard/soft segment ratio, other modifications to the polymer structure including the isocyanate type (e.g. MDI, TDI, etc.) isomer structure (e.g. 2,4-Toluene diisocyanate vs. 2,6-Toluene diisocyanate), polyol type (e.g. polyether, polyester), and selection of cross-linkers and chain extenders are used in various embodiments to influence the degree of transparency of the cast polyurethane.

In various embodiments of the present technology, the processing conditions influence transparency. In the case of polyurethane, the temperature at which the components are reacted has a very strong effect on the transparency, since the process temperature influences both the tendency of the chains to orient, and the time available for oriented structures to form by influencing the kinetics of the reaction. Control of the polymer precursor and mold/caster temperatures to within about ±1° C. is used with the present technology to maintain consistent results for some polymer types and transmissivity levels.

Embodiments of the present technology use the family of thermoset plastics. For a given polymer composition, altering control parameters like temperature, centrifugal force and cure conditions (e.g. time, temperature, pressure, etc.) results in changes to transmission characteristics of the CMP pad material made using the thermoset plastic. The capability to control transmission and the sensitivity to the parameters, control transmission depends on the chemistry of the thermoset plastics used. For example, a ±1° C. change in temperature may cause transmissivity to change from 30% to 45%. Using a different chemistry polymer and/or polymer precursor may increase or decrease this sensitivity.

Exemplary embodiments use the thickness of material which is molded (i.e. polymerized) to control the transmissivity of a CMP pad. For exothermic processes, when polymerization starts, the energy increases in the mixture, and therefore the temperature increases. Typically, the thicker the material, the lower the transmissivity, though it is possible for the opposite to be true. As the material that is used for a CMP pad is thinned, the transmission will typically increase, within limits. If the material that is molded has a high transmission level, then the transmission level may decrease slightly, remain unchanged, or will only increase slightly when the material is thinned. For example, a material with 100% transmission (i.e. transparent) cannot be increased to more than 100%. Controlling the Total Thickness Variation (TTV) may be important in the context of controlling an optical transmission property of a polish pad material, since the thickness of the material may correlate with transmissivity. Therefore, to control the optical transmission, for example, to a specific percentage between 0% and 100% may require that the variation in thickness be very low. Low TTV may be obtained using centrifugal casting methods discussed in U.S. patent application Ser. No. 13/854,856 filed Apr. 1, 2013, entitled "Methods and Systems for Centrifugal Casting of Polymer Polish Pads and Polishing Pads Made by the Methods", and a low TTV helps control optical transmission properties.

In various exemplary embodiments, the preparation of the raw materials for manufacturing a polymer polish pad require significant control to ensure that consistent raw material ratios are input into the mixture. For example, the raw materials may need to be heated separately before mixing. In addition, the raw materials may preferably be mixed thoroughly to result in even dispersion within the mixture.

In some embodiments, a solid homogenous polymer polish pad or polish pad layer may be produced, for example, by centrifugal casting. Production of a solid homogenous polymer sheet by centrifugal casting enables the manufacture of a polish pad that is free of voids. The temperature and speed (in Rotations Per Minute (RPM)) of a centrifugal caster used to make a polish pad or polish pad layer may be altered depending on the desired pad or pad layer characteristics, including transmissivity. In addition or separately, the type of polymer precursor being used may also be varied to modify the transmissivity.

In various exemplary embodiments of the present technology, a centrifugal casting system and method allows the formation of a thin sheet of solid homogenous polymer with low total thickness variation. A thin sheet of polymer (for example, polyurethane) can be easily converted to a solid polymer polish pad or pad layer which is absent of voids or pores. The presence of voids or pores typically impacts transmissivity.

In exemplary embodiments, heating during centrifugal casting is performed by heating elements that surround or are adjacent to the casting drum. Such heating elements heat the drum and/or the air in the drum. Typically, the drum is pre-heated prior to introduction of the polymer precursor. Additional steps may be added to the casting operation to improve product properties and/or to modify or tune transmissivity of the resulting CMP pad.

Figure 1:
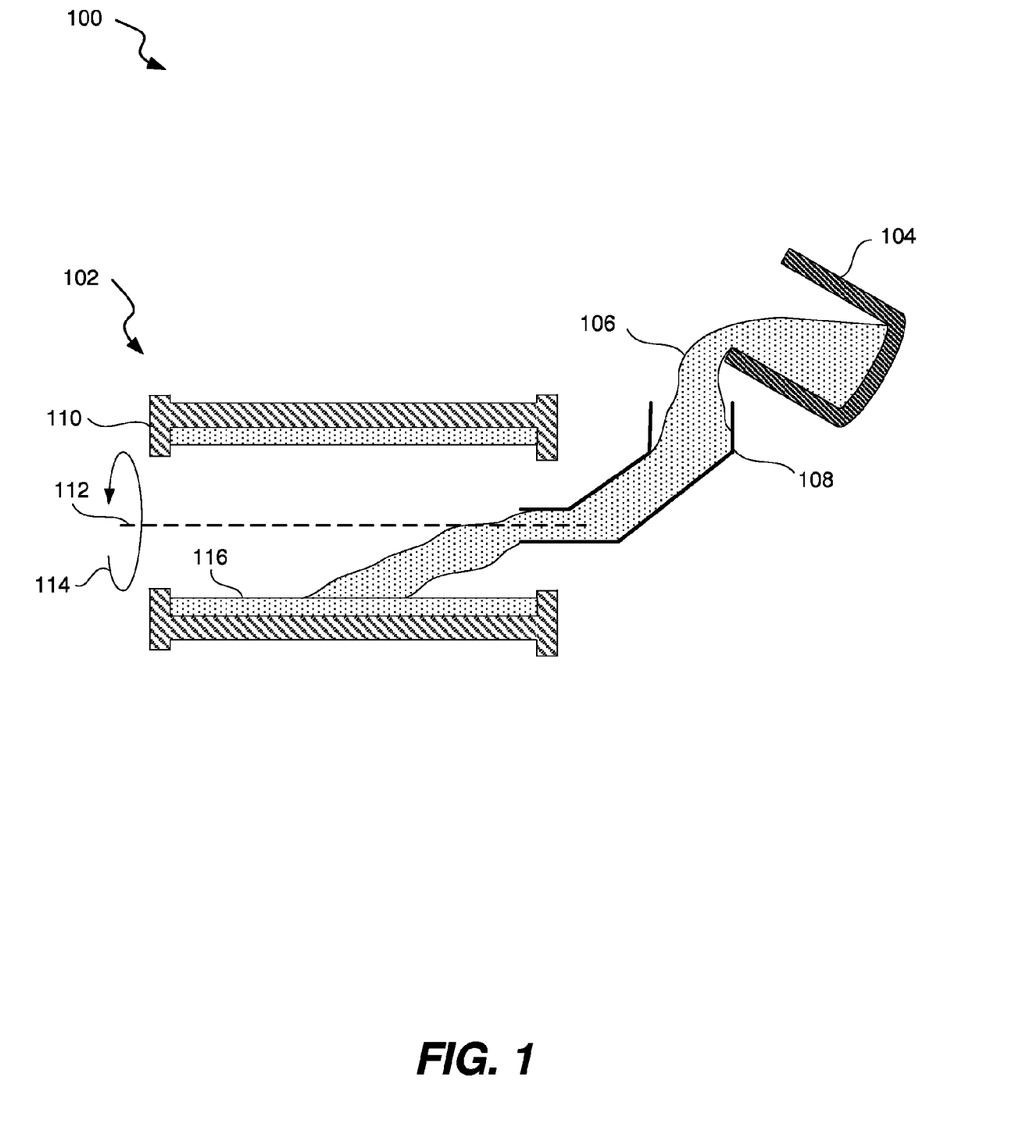
FIG. 1 is a schematic diagram illustrating a casting system, according to an example embodiment.

FIG. 1 is a schematic diagram illustrating spin casting system 100 including centrifugal caster 102 and polymer container 104. Polymer container 104 contains polymer mixture 106. Polymer container 104 may include a mixing apparatus and include jackets, which may be a heated element having conduits for heated fluid to flow through, and/or electrical heating elements. Polymer mixture 106 may be a polymer mixture that will phase separate into multiple layers under centrifugal force. Polymer mixture 106 may be one polyurethane mixture with microspheres (or a similar less dense material) added to change the density of the mixture.

Polymer mixture 106 may be poured from polymer container 104 into pouring spout 108 that directs polymer mixture 106 into drum 110 of centrifugal caster 102 while drum 110 is spinning around axis 112 in rotational direction 114. Polymer mixture 106 may spread out to form polymer sheet 116 on an interior surface of drum 110 due to centrifugal force. In the case of drum 110, polymer sheet 116 may be cylindrical in shape. Drum 110 may spin, and may have a diameter such that at whatever rotational velocity drum 110 turns, the centrifugal force experienced by polymer mixture 106 after introduction into drum 110 is sufficient to create a uniform thickness of polymer sheet 116, and to additionally cause phase separation. Phase separation may occur under centrifugal force and may cause polymer mixture 106 to separate into a pure polymer layer and a polymer layer infused with microspheres.

Drum 110 may be heated. Drum 110 may have a smooth interior drum face, or alternatively may have a textured drum face that improves the performance of adhesives used in the polishing pad, that provides grooves to a surface of a polish pad made according to the method, and/or that facilitates the separation and/or forming of a polish pad from a cured and casted polymer sheet formed by the method.

By adjusting the process parameters associated with the operation above, including the type and ratios of the polymer precursors, heating (of precursors, polymer mixtures, drum casters, and/or polymerization or casting conditions), and/or drum rotational speed (in the case of a centrifugal caster), the transmissivity of the polish pad created during the process may be adjusted and controlled. The transmissivity may vary depending on the wavelength of the light, and therefore the transmissivity may be adjusted as a function of wavelength. Higher transmissivity may help endpoint detection performance for certain polish applications.

Figure 2:
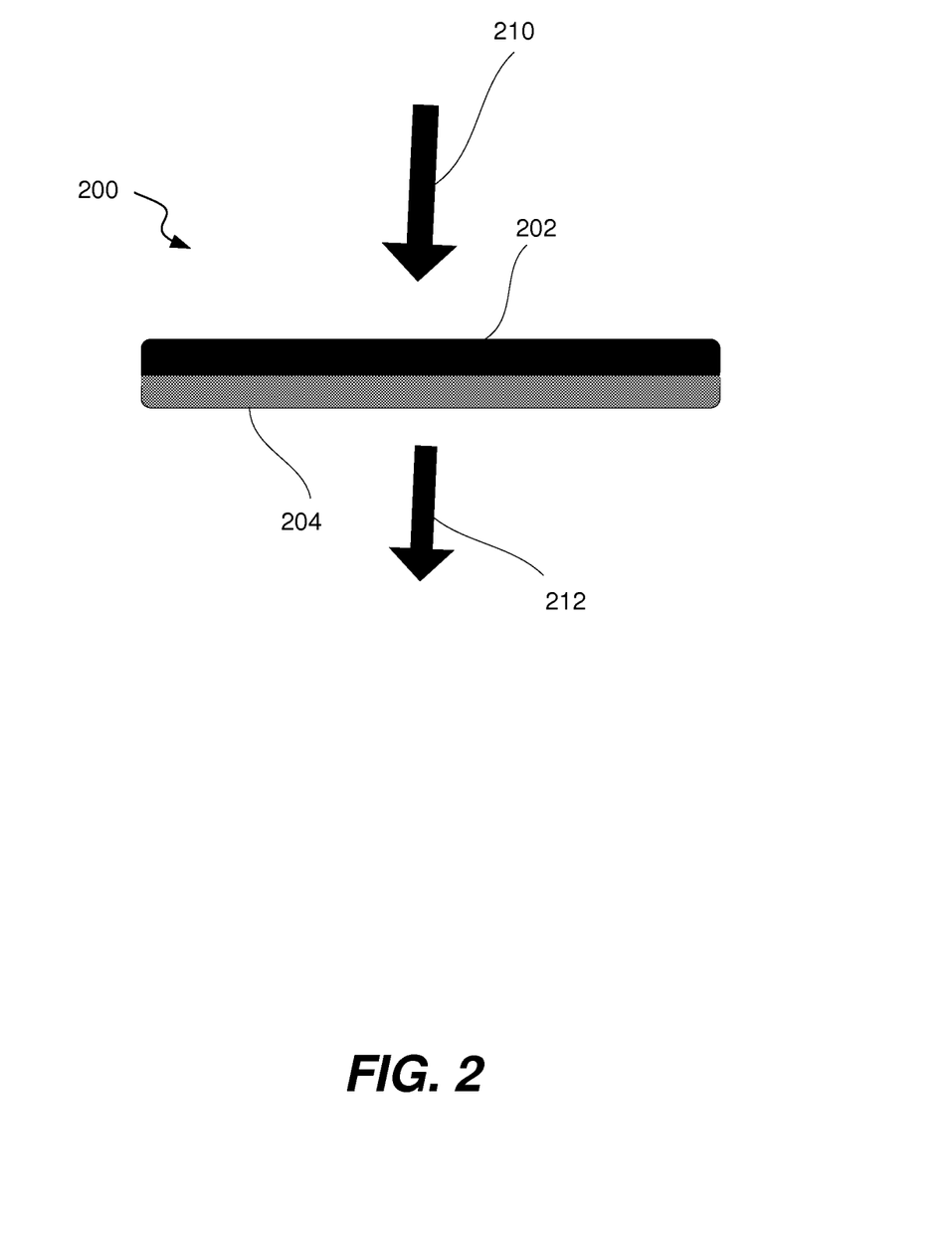
FIG. 2 is a schematic diagram illustrating a cross-section of an example polymer pad, according to an example embodiment.

FIG. 2 is a schematic diagram illustrating a cross-section of polymer pad 200 including dense polymer layer 204 (also referred to as hard pad 204) and porous polymer layer 202 (also referred to as sub-pad 202). Polymer pad 200 may be cut out or punched out of polymer sheet 116. The removed polymer pad 200 includes sub-pad 202 and hard pad 204. Hard pad 204 is formed from dense polymer layer 204 while sub-pad 202 is formed from porous polymer layer 202. Both hard pad 204 and sub-pad 202 may be used for polishing. Although the solid side (hard pad 204) is conventionally used for polishing, the porous side (sub-pad 202, though for this use it would not be a sub-pad) may be used. Sub-pad 202 may have pores that are packed extremely tight, allowing for higher compressibility. The closed cell nature of the pores will prevent CMP process liquids from wicking through the sub-pad. Light 210 may be projected at sub-pad 202 and may pass through polymer pad 200 as transmitted light 212. Light 212 may represent an attenuated version of light 210 due to transmission loss caused by reflection, absorption, and/or diffraction in one or both of sub-pad 202 and hard pad 204. Light 212 may reflect off of a wafer and may be detected directly, may be reflected and detected, and/or may be transmitted up through hard pad 204 and sub-pad 202. The reflection of light 212 may be used to determine the endpoint of a CMP process.

Additionally, sub-pad 202 may have one or more windows, which may be formed during the pad polymerization or casting process via molds (see below), or by machining or punching holes in the sub-pad after forming. The holes may be filled with transparent plugs, or may be left as voids. The transmissivity of polymer pad 200, with or without windows or voids in sub-pad 202, may be anywhere from 0% to 100% in any particular wavelength, and may typically be 30% to 40%. By adjusting any of the parameters discussed herein, the transmissivity may also be adjusted. The present technology may be used to obtain a high degree of control over the optical transmission properties of a polish pad material.

Figure 3:
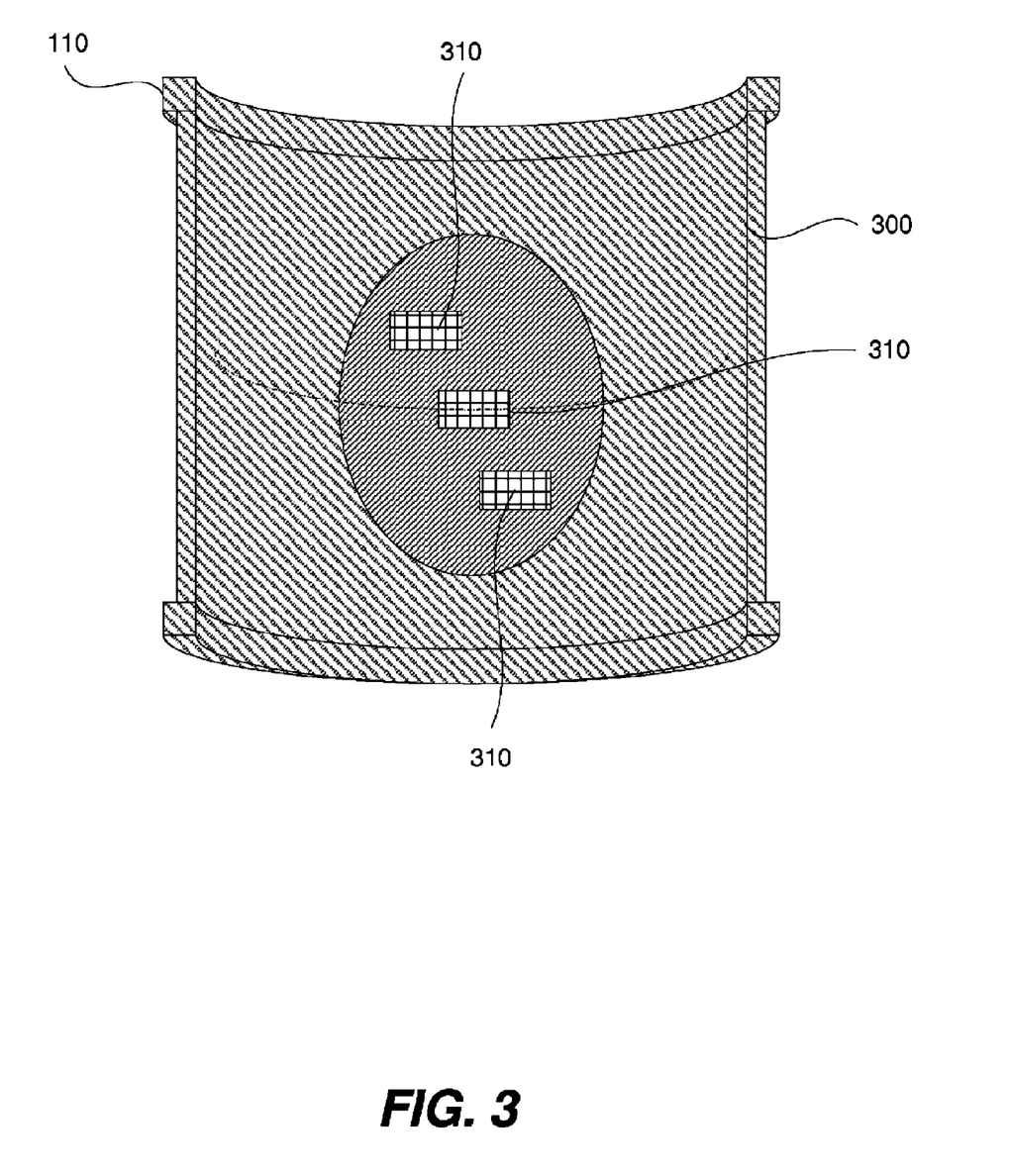
FIG. 3 is a schematic diagram illustrating a cross-section of the example drum and showing an example mold insert and window, according to an example embodiment.

FIG. 3 is a schematic diagram illustrating drum 110 with mold insert 300 lining the interior wall of drum 110 of a centrifugal caster. Mold insert 300 may be any thermally stable and chemically compatible material such as, but not limited to, a polymer, metal or ceramic sheet lining the interior of the drum 110. The mold insert may be made from materials such as, but not limited to, Teflon, HDPE, Thermoplastic or PTFE. The use of a release agent with the mold insert may help ease the removal of the cast polymer. Mold insert 300 may have at least one mold of a polishing pad, with the number of molds depending on the size of drum 110 and the size of the polishing pad. The mold of mold insert 300 may be a single mold or a plurality of molds, which may be fixed or removable and which may have a fixed or a variable distance from an axis to vary an amount of centrifugal force experienced by the polymer during the casting process. The mold or molds of mold insert 300 may form an outline of a CMP pad, and may have a textured surface in regard to drum 110. For example, mold insert 300 may have four molds on the sheet that lines drum 110, thus potentially producing four polishing pads in one casting. In this embodiment, a polymer mixture may be poured into each mold individually, which will eliminate the need to cut or punch out the polishing pad from a polymer sheet. Alternatively, mold insert 300 may cause polymer mixture to flow into the shape of the CMP pad and prevent or avoid material flowing into the interstitial areas, thereby preventing waste. Through these exemplary methods, waste can be reduced. Window molds 310 may be one or more window molds formed in mold insert 300 to form one or more windows in a CMP pad. Window molds 310 may be positioned in any advantageous manner. Additionally, the window panels themselves may be made using the present technology to modify the transmissivity of the window, and to thereby modify the transmissivity of the CMP pad having the window.

In an exemplary process, a sub-pad may be formed by casting using mold insert 300 and window molds 310, with the prepolymer used to form the sub-pad filling mold insert 300 up to the level of a top of window molds 310. After completing the casting of the sub-pad, a subsequent pour of the same or different prepolymer into mold insert 300 covering the sub-pad and covering window molds 310 may form a top-pad. The top-pad may be tuned to have a particular transmissivity, and after curing, may bond to the sub-pad without the use of a pressure sensitive adhesive (PSA) and without further manipulation. The CMP pad made by this method may have a window slot in the sub-pad and a translucent or transparent top-pad, and therefore may have a complete window without the need to align the sub-pad and the top-pad during production.

In a further exemplary process, window molds 310 may be eliminated, and the process reduced to a single pour operation, when transparent or translucent microspheres are used in the prepolymer cursor. In this manner, phase separation may occur during centrifugal casting of the CMP pad, and the microspheres may migrate to a top layer of the CMP pad to form a sub-pad. The prepolymer itself and the casting conditions may be adjusted as discussed herein to create a translucent or transparent CMP pad, and the translucent or transparent microspheres may enable the sub-pad also to be translucent. Some loss of transmissivity is likely due to the refraction and/or diffraction of light off and/or through the microspheres.

In still further exemplary embodiments, the present technology may enable a production process that eliminates the need to align a window in a sub-pad with a window in a top-pad, thereby streamlining the production of a CMP pad. Conventionally, windows through a top-pad have been used in an optical endpoint detection system, and may include a transparent panel or plug material that is bonded to the sides of a cut-out of the top-pad. The sub-pad may also have a cut-out which may or may not include a transparent plug. A pressure-sensitive adhesive (PSA) layer may be interposed between the top-pad and the sub-pad to attach the two pads. By making the top-pad substantially transparent (also referred to herein as translucent or transmissive), a sub-pad may be made with a window or windows, or alternatively also substantially transparent or translucent. Bonding such a sub-pad to a transparent top-pad would not require alignment of two windows, and therefore may be considered self-aligning. For example, in the case of the sub-pad having window(s), the windows may be formed by punching the sub-pad after application of a PSA layer, thereby causing the punching to form window(s) in the PSA layer aligned with the window(s) of the sub-pad automatically.

Figure 4:
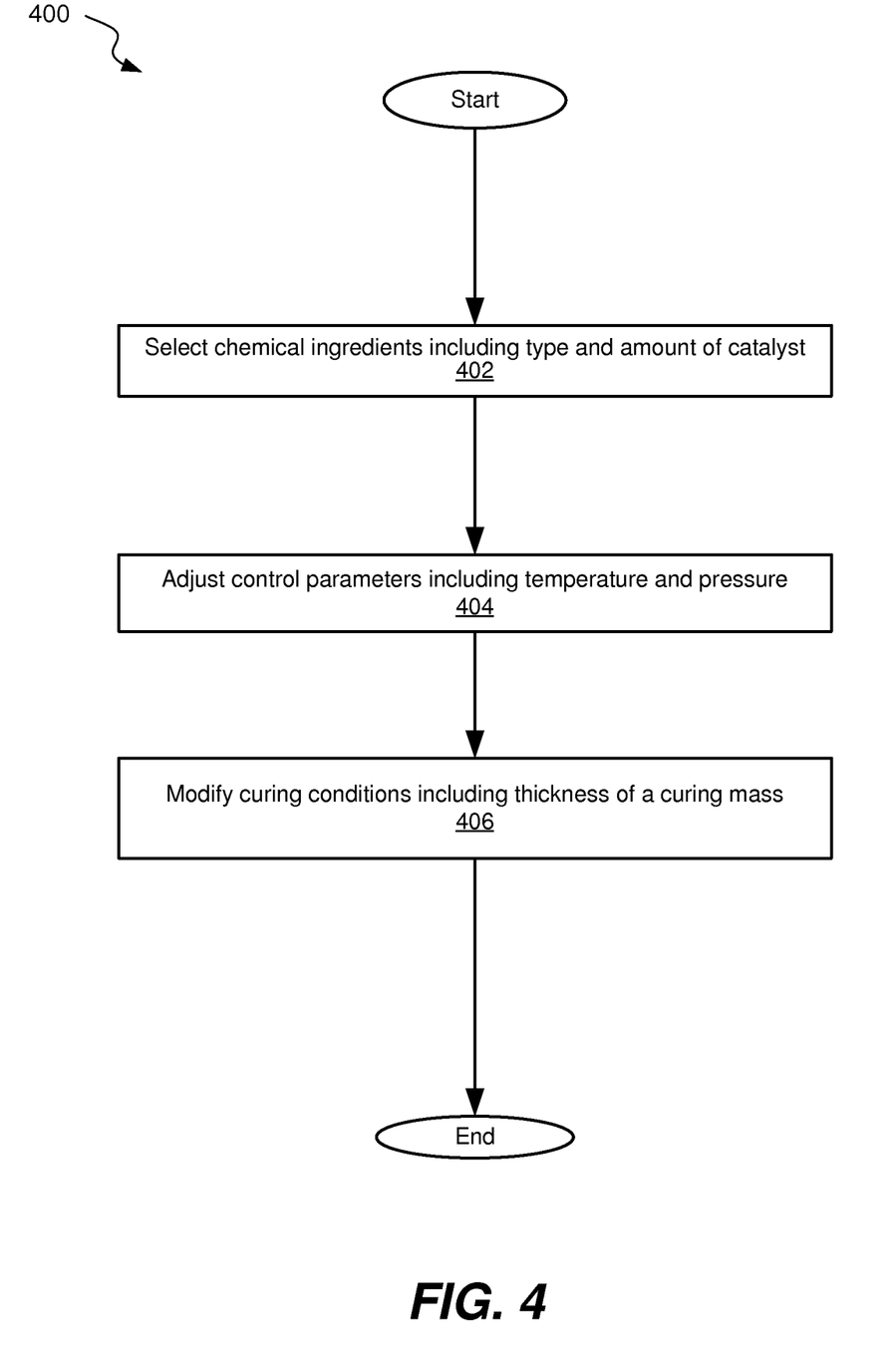
FIG. 4 is a flow chart illustrating an example method for making a multilayer polishing pad, according to an example embodiment.

FIG. 4 is a process flow diagram showing a method 400 according to the present technology using polyurethane. However, the method is also applicable to other polymers, as discussed herein. As shown in FIG. 4, the method 400 may commence at operation 402, which indicates to select the chemical ingredients. From operation 402, the flow proceeds to operation 404, which indicates to adjust the control parameters, including temperature, pressure, casting material thickness and mass. From operation 404, the flow proceeds to operation 406, which indicates to modify curing conditions including thickness of a curing mass. An additional step may include to optionally form at least one aperture or multiple apertures in a sub-pad to facilitate the optical transmission of light through a top-pad material using molds, laser machining, or mechanical machining (not shown). The process flow ends after operation 406.

A polymer casting system may involve mixing a prepolymer (also referred to as a precursor) with a chain extender and a plasticizer. A chain extender, such as MOCA, may be added to the prepolymer at a molar ratio of around 1:1 with the unreacted isocyanate. For example, a mixing ratio of 0.95:1 for the MOCA to unreacted isocyanate may be used. The prepolymer may be TDI or MDI system. Alternatively, diisocyanates or other polyisocyanates may be reacted with a polyol of choice. In another embodiment, a harder polyurethane mixture may be dispensed into the cylinder and cured before dispensing a softer polyurethane mixture into the cylinder. All of the process conditions, including the type and amount of polymer, and type and amount of microspheres, may be modified to adjust the transmissivity of the CMP pad.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

What is claimed is:

1. A method for controlling optical transmissivity of a polish pad material for use as a translucent chemical mechanical planarization top-pad (translucent CMP top-pad) for a chemical mechanical planarization pad, comprising:
    adjusting a degree of crystallinity of the polish pad material based on a selection of polymer structures in chemical ingredients and casting controls to orient the polymer structures, the degree of crystallinity affecting light transmission and the optical transmissivity of the polish pad material;
    pouring sub-pad material into a mold insert in a drum, the mold insert having a window mold;
    centrifugal casting of the sub-pad material in the mold insert by rotating the drum, the centrifugal casting of the sub-pad material forming a chemical mechanical planarization sub-pad (CMP sub-pad) in a shape of the mold insert, the CMP sub-pad having a sub-pad window slot formed using the window mold;
    pouring the polish pad material into the mold insert in the drum;
    centrifugal casting of the polish pad material in the mold insert by rotating the drum using the casting controls, the centrifugal casting of the polish pad material forming the translucent CMP top-pad in the shape of the mold insert, the translucent CMP top-pad being transmissive to light and covering the sub-pad window slot;
    tuning optical transmissivity of the translucent CMP top-pad by the adjusting of the degree of crystallinity of the polish pad material based on the selection of the polymer structures in the chemical ingredients and the casting controls to orient the polymer structures; and
    wherein the sub-pad window slot and the translucent CMP top-pad covering the sub-pad window slot are used for optical endpoint detection of a polishing tool.

2. The method of claim 1, wherein the adjusting the degree of crystallinity of the polish pad material comprises at least one of
    forming ordered, crystalline regions by reacting isocyanate and chain extension groups; and
    forming soft, flexible regions by adding polyols.

3. The method of claim 1, wherein the polymer structures comprise at least one of chain length, degree of cross-linking, and presence of side groups.

4. The method of claim 1, further comprising mixing the chemical ingredients to result in an even dispersion within a mixture of the chemical ingredients.

5. The method of claim 4, further comprising at least one of controlling a first temperature of the chemical ingredients individually before the mixing and controlling a second temperature of the chemical ingredients during the mixing.

6. The method of claim 5, wherein the controlling of the at least one of the first temperature and the second temperature includes controlling a rate of temperature change.

7. The method of claim 1, further comprising adding a material with a lower density than the chemical ingredients to the chemical ingredients.

8. The method of claim 7, wherein the material with a lower density includes microspheres.

9. The method of claim 1, wherein the casting controls comprise at least one of a temperature and a pressure of the polish pad material during a casting operation.

10. The method of claim 9, wherein the casting controls include the temperature; and the temperature includes controlling a rate of cooling the polish pad material.

11. The method of claim 1, wherein the casting controls include centrifugal force from rotating the polish pad material in a cylinder, a thickness variation of the polish pad material being a function of centrifugal force from the rotating the polish pad material in the cylinder.

12. The method of claim 1, further comprising adjusting the degree of crystallinity of the polish pad material using curing controls, the curing controls comprising at least one of a time, a temperature, and a pressure of the polish pad material during curing.

13. The method of claim 12, wherein the temperature includes a rate of temperature change.

14. A method for controlling optical transmissivity of a chemical mechanical planarization top-pad (translucent CMP top-pad) for a chemical mechanical planarization pad, comprising:
    adjusting a degree of crystallinity of a first polymer precursor based on a selection of polymer structures for the first polymer precursor;
    arranging the first polymer precursor in a mold insert in a centrifugal caster for a chemical mechanical planarization sub-pad (CMP sub-pad), the mold insert having a window mold;
    rotating the centrifugal caster to form the CMP sub-pad in a shape of the mold insert, the CMP sub-pad having a sub-pad window slot formed using the window mold;
    adjusting a degree of crystallinity of a second polymer precursor based on a selection of polymer structures for the second polymer precursor, the degree of crystallinity affecting light transmission and optical transmissivity of the second polymer precursor;
    arranging the second polymer precursor in the mold insert in the centrifugal caster for the translucent CMP top-pad;
    rotating the centrifugal caster to form the translucent CMP top-pad in the shape of the mold insert, the translucent CMP top-pad being transmissive to light and covering the sub-pad window slot;
    adjusting casting controls comprising at least one of a rate of cooling of the first and the second polymer precursors and a pressure of the first and the second polymer precursors during a casting operation to orient the polymer structures, the polymer structures comprising at least one of chain length, degree of cross-linking, and presence of side groups;
    tuning optical transmissivity of the translucent CMP top-pad by the adjusting of casting controls; and
    wherein the sub-pad window slot and the translucent CMP top-pad covering the sub-pad window slot are used for optical endpoint detection of a polishing tool.

15. The method of claim 14, further comprising forming at least one window in the CMP sub-pad to facilitate optical transmission of light through the translucent CMP top-pad using at least one of laser machining, punching, and mechanical machining.

16. A chemical mechanical planarization pad with controlled optical transmissivity of a translucent chemical mechanical planarization top-pad (translucent CMP top-pad), comprising:
    a chemical mechanical planarization sub-pad (CMP sub-pad) in a shape of a mold insert having a window mold, the CMP sub-pad having a sub-pad window slot in a shape of the window mold, the CMP sub-pad comprising materials of different densities;

the translucent CMP top-pad being in the shape of the mold insert, the translucent CMP top-pad being transmissive to light and covering the sub-pad window slot;

wherein the translucent CMP top-pad has an adjusted degree of crystallinity of a polish pad material based on a selection of polymer structures in chemical ingredients and casting controls to orient the polymer structures, the degree of crystallinity affecting light transmission and optical transmissivity of the polish pad material;

wherein the translucent CMP top-pad has the optical transmissivity of the polish pad material tuned by the adjusted degree of crystallinity of the polish pad material based on the selection of the polymer structures in the chemical ingredients and the casting controls to orient the polymer structures; and wherein the sub-pad window slot and the translucent CMP top-pad covering the sub-pad window slot are used for optical endpoint detection of a polishing tool.

17. The chemical mechanical planarization pad of claim 16, wherein at least one of the materials of different densities includes microspheres.

18. The chemical mechanical planarization pad of claim 16, wherein the sub-pad window slot contains a second polymer, a transmissivity of the second polymer being greater than a transmissivity of the CMP sub-pad.

* * * * *

UNITED STATES PATENT AND TRADEMARK OFFICE
CERTIFICATE OF CORRECTION

PATENT NO. : 10,022,842 B2
APPLICATION NO. : 14/626256
DATED : July 17, 2018
INVENTOR(S) : Thomas West et al.

Page 1 of 1

It is certified that error appears in the above-identified patent and that said Letters Patent is hereby corrected as shown below:

On the Title Page

Item (63), the text "Continuation" should read --Continuation-in-part--

In the Claims

Column 9, Line 46, Claim 2, immediately following the text "at least one of", insert a --:--

Signed and Sealed this
Twenty-sixth Day of February, 2019

Andrei Iancu
*Director of the United States Patent and Trademark Office*